United States Patent Office 3,502,003
Patented Mar. 24, 1970

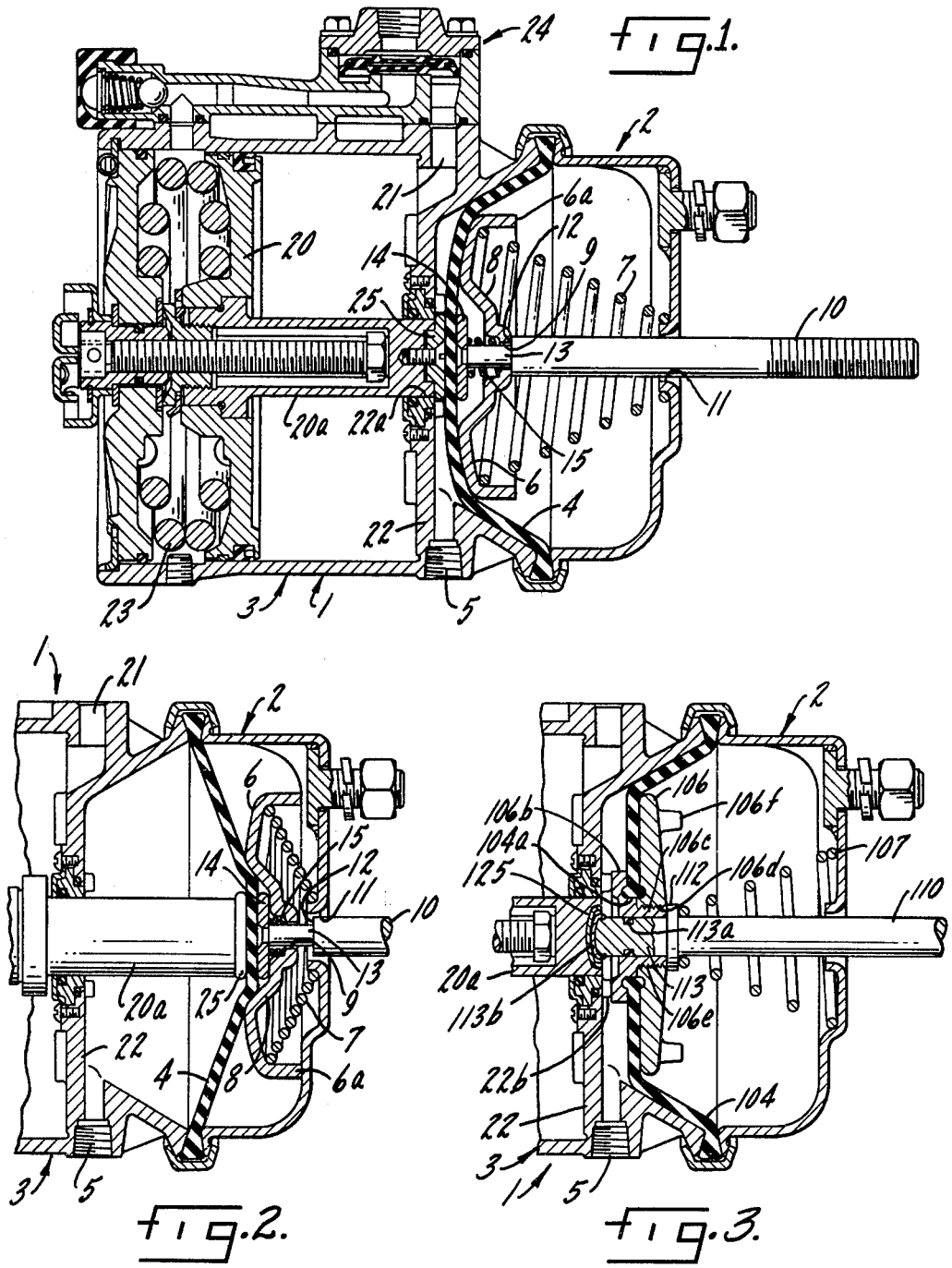

3,502,003
BRAKE ACTUATOR AND OVERTRAVEL ASSEMBLY
Harold L. Dobrikin, Highland Park, and Boleslaw Klimek, Des Plaines, Ill., assignors to Berg Mfg. & Sales Co., Des Plaines, Ill., a corporation of Illinois
Filed May 8, 1967, Ser. No. 636,959
Int. Cl. F01b 7/00, 19/02; F16j 1/10
U.S. Cl. 92—63
5 Claims

ABSTRACT OF THE DISCLOSURE

A brake actuator including an actuator arm, service and emergency chambers having elements for moving the arm through its normal travel in brakes-on direction, there being a slidable engagement between the actuating arm and some of said elements, an extension of said arm being exposed for engagement by an emergency brake actuating means for further movement of said actuating arm in said direction.

---

This invention relates to vehicle brake actuators and has particular relation to brake actuators usable on truck-trailer type vehicles.

One purpose of the invention is to provide a brake actuator having means insuring application of adequate, safe braking forces under varying conditions.

Another purpose is to provide a brake actuator effective to apply adequate, safe braking action when the vehicle drum brakes have been expanded due to overuse and heating.

Another purpose is to provide a brake actuator effective to provide adequate, safe braking action to improperly adjusted brake elements.

Another purpose is to provide a brake actuator capable of providing adequate braking action to vehicles having worn braking elements.

Another purpose is to provide a brake actuator having means for moving a brake arm through a normal excursion for application of adequate, safe braking action with properly adjusted brake elements and means providing a further excursion of said brake arm for adequate, safe braking action with maladjusted brake elements.

Other purposes will appear from time to time during the course of the specification and claims.

The invention is illustrated more or less diagrammatically in the accompanying drawings wherein:

FIGURE 1 is a side elevation in cross section;

FIGURE 2 is a partial view illustrating some of the parts of FIGURE 1 in another position; and FIGURE 3 is a side elevation in cross section illustrating a variant form of the invention.

Like parts are indicated by like numerals throughout the specification and drawings.

Referring now to the drawings, and particularly to FIGURE 1, the numeral 1 generally designates a brake actuator housing. The housing may comprise two major segments defining a service chamber, indicated generally by the numeral 2, and an emergency chamber indicated generally by the numeral 3. The service chamber or segment 2 is divided by a flexible diaphragm 4. A service pressure inlet 5 directs pressure to one side of the diaphragm 4. A plate 6 engages the opposite side of the diaphragm 4 and is urged thereagainst by spring 7. The plate 6 has an axial depression 8 centrally apertured as at 9.

A brake actuating arm 10 extends through an aperture 11 in the end wall of service chamber 2 and has a shoulder 12 engaged by the depression 8 about the aperture 9. A reduced stub arm portion 13 of the arm 10 extends through the aperture 9 and carries a subplate 14 in engagement with the center of the side of the diaphragm engaged by the plate 6. A spring 15 has its opposite ends in engagement with the depression 8 and the rear face of plate 14 to urge the plates 14 and 6 in opposite directions.

A piston 20 is reciprocal in emergency chamber 3. An inlet 21 directs fluid pressure to one side of piston 20 and to urge it away from a dividing baffle wall 22 which separates the service chamber 2 and emergency chamber 3. A powerful spring 23 engages the opposite side of piston 20 to urge the same toward baffle 22. An air pressure transfer structure is indicated generally at 24. Since the structure 24 bears no direct relation to the present invention, it will not be further described herein.

A central axial extension 20a is carried by piston 20 and extends slidably through a central aperture 22a in the baffle 22. An end element 25 is carried by the extension 20a and, with the parts in the position of FIGURE 1, element 25 engages the center of the diaphragm on the side impinged by pressure entering at inlet 5, the extension 20a, plates 6, 25 and 14, springs 7 and 15 and the arm 10 being coaxial.

Referring now to FIGURE 3, in which a variant form of the invention is disclosed, parts corresponding to those appearing in FIGURE 1 have been, for convenience and clarity, provided with identical numerals. In the form of FIGURE 3, however, a brake actuator arm 110 has an annular flange 112, the rear surface of which is engaged by a spring 107, the opposite end of the spring 107 being seated upon the end wall of chamber 2. Shaft 110 has a continuing end portion 113 upon which a diaphragm backing plate 106 is slidably received. A seal 113a is provided for engagement with the inner wall of a central opening in a clamp piece 106b. The diaphragm 104 is centrally apertured as at 104a and the plate 106 and clamp piece 106b clamp the diaphragm 104 therebetween about the aperture 104a. The sleeve extension portion 106c of clamp 106b, through which arm portion 113 reciprocally extends, may be engaged in aperture 106d of plate 106 in any suitable manner, as by the threads illustrated at 106e. The rear surface of plate 106 carries a plurality of circumferentially spaced, rearwardly extending legs 106f for engagement with the end wall 102 of chamber 2. The baffle wall 22, in the form illustrated in FIGURE 3, includes legs 22b against which a forward surface of clamp member 106b engages when the parts are in the position illustrated in FIGURE 3. The end surface of portion 113 carries a convex or partially spherical wear element 113b. The end surface of piston extension 20a carries a wear member 125 of concave configuration adapted to mate with the member 113b. It will be noted that, with the parts in the position illustrated in FIGURE 3, the elements 113b, 125 engage in direct contact at a point adjacent and slightly within a line corresponding to the major surface of baffle wall 22 within service chamber 2 and that flange 112 abuts the rear surface of sleeve portion 106c and plate 106.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

In normal operation of a vehicle having properly adjusted brakes the slack adjustor (not shown) engaged by the outer distal end of arm 10, for example, is adjusted for movement through a predetermined distance and with sufficient force to bring the brake shoe (not shown) into adequate, safe braking engagement with the brake drum (not shown) carried by the vehicle wheel. In such normal operation the vehicle operator actuates an application valve, for example by depressing a foot pedal within the vehicle cab. Such application of the application valve results in the delivery of fluid pressure at inlet 5 to move the diaphragm 4 toward the end wall of chamber 2, or to the right as the parts are shown in FIGURE 1. Such movement of the diaphragm 4 results in the movement of plate 6 and, with it, the shaft 10 as a result of the engagement of depression 8 with the shoulder 12, the movement of diaphragm 4, plate 6 and shaft 10 being against the relatively weak action of spring 7. In such normal operation the presence of air in emergency chamber 3 retains the piston 20 in the position shown in FIGURE 1 and the spring 23 in its compressed state as shown in FIGURE 1. Similarly, with normal brake adjustment, failure or release of pressure before piston 20 releases spring 23 to move diaphragm 4, plate 6 and arm 10 through its normal excursion to apply the brakes.

When the plate 6 moves its maximum available travel to the right, its rearwardly extending flange 6a will abut the end wall of chamber 2. Since the plate 14 is of relatively small planar area, the spring 15 is sufficient to resist the effect of normal air pressure entering at inlet 5 and to retain the plate 14 in the relative position shown in FIGURE 1, with respect to diaphragm 4 and plate 6. With normally adjusted brakes the travel of plate 6 and arm 10 to a predetermined point through the space between its position shown in FIGURE 1 and the engagement of flange 6a with the end wall of chamber 2 will be such as to move arm 10 through its normal excursion and to supply adequate, safe braking action.

Should the brake drums be expanded by repeated use and resulting heating of the brake drum, or should the relationship of the braking elements be maladjusted, it will be realized that inadequate, unsafe braking may be occurring even though the plate 6 and arm 10 have traversed through their maximum excursion toward braking position. This may be true even though the brake shoe is touching the brake drum, but with inadequate force. In such event the structure of the present invention is effective to provide an overtravel or added excursion of the brake actuator arm 10 and to supply adequate, safe braking action until the brakes can be repaired or properly adjusted. As illustrated in FIGURE 2, the operator through suitable controls (not shown) provided at hand in the cab may discharge the pressure from in front of piston 20 within emergency chamber 3 and release the spring 23, whereupon the piston 20 and extension 20a will be moved in brake-applying direction, or to the right as the parts are shown in the drawings. Movement of extension 20a into service chamber 2 is sufficient to bring plate 25 into engagement with diaphragm 4 on the opposite side of plate 14 and to move plate 14 into depression 8 against the action of spring 15 and thus, through the mediacy of stub shaft portion 13, to move the brake arm 10 an additional distance. As the parts are dimensioned in the drawings the overtravel thus produced may be of the order of one-fourth inch, which would under most circumstances be sufficient to provide adequate, safe braking action. It will be understood, however, that the amount of overtravel may be adjusted through dimensioning the parts as desired without departing from the nature and scope of the invention.

In the form of the invention illustrated in FIGURE 3, the action of the parts is substantially identical with that above described. With arm 110 at its normal full extension, with the legs 106f in engagement with the end wall 102 of chamber 2, for example, and if such movement should prove inadequate, the operator may release piston 20 and spring 23 to bring the wear end surface 125 of extension 20a into engagement with the wear end surface 113b of the extension 113 on shaft 110 and thus to move the shaft 110 a further distance, the spring 107 being free for further compression by movement of the flange 112 away from plate 106.

There is claimed:

1. A brake actuator including a brake actuating arm movable through a predetermined distance in its normal excursion toward brakes-on position, and through a further excursion toward brakes-on position, fluid pressure means to move said arm through said normal excursion for service braking, spring pressure means engageable with said arm to move said arm through said further excursion for overtravel braking, said fluid pressure means including a movable wall and a plate member secured to and movable with said wall, a central aperture in said plate member and wall, said arm having an end portion extending slidably through said aperture and beyond said wall and plate member for engagement by said spring pressure means.

2. A brake actuator including a housing, a movable wall dividing said housing and comprising a diaphragm, a plate member movable with said wall, a brake actuator arm extending into said housing in substantially perpendicular relationship with said plate member, said plate member and arm having abutting surfaces engageable in response to movement of said plate member toward brakes-on direction to move said arm in said direction, a second movable wall in said housing, spring means engageable with said second movable wall and positioned to move it in said brakes-on direction, an extension on said second movable wall in substantially axial alignment with said brake-actuating arm, said plate member and said diaphragm are formed with aligned central apertures, and said actuating arm includes a cylindrical portion projecting through said apertures for contact with said second wall extension and with said cylindrical portion adapted for axial sliding movement relative to said plate member and diaphragm.

3. The structure of claim 2 and further including clamp means for clamping said diaphragm and plate member together at their inner periphery, said clamp means having a central bore defining said apertures, and sealing means on at least either of the outer surface of said cylindrical portion or the inner surface of said clamp means to provide a fluid-tight seal therebetween.

4. The structure of claim 2 and further characterized in that said cylindrical portion is formed with a spherical segment on its projecting end, and said second wall extension is formed with a spherical segment on its projecting end for mating contact with said cylindrical portion spherical segment.

5. The structure of claim 4 and further characterized in that at least either of said spherical segments comprises a wear plate removably mounted on a respective arm cylindrical portion or second wall extension.

References Cited

UNITED STATES PATENTS

| | | | |
|---|---|---|---|
| 512,790 | 1/1894 | Bachman | 92—62 |
| 2,367,852 | 1/1945 | Eaton | 92—52 |
| 2,433,221 | 12/1947 | Huber | 92—101 X |
| 2,465,714 | 3/1949 | Elliott | 92—100 X |
| 2,649,842 | 8/1953 | Caldwell et al. | 92—62 X |
| 2,713,850 | 7/1955 | Bradbury et al. | 92—100 X |
| 2,936,785 | 5/1960 | Hastings | 92—63 X |
| 3,077,186 | 2/1963 | De Beaubien et al. | 92—62 X |
| 3,107,583 | 10/1963 | Woodward | 92—63 |
| 3,131,609 | 5/1964 | Dobrikin et al. | 92—64 X |
| 3,353,637 | 11/1967 | Chana | 92—62 X |
| 3,424,062 | 1/1969 | Gummer et al. | 92—63 |

MARTIN P. SCHWADRON, Primary Examiner

I. C. COHEN, Assistant Examiner

U.S. Cl. X.R.

92—64, 101, 129